(12) United States Patent
Kangas

(10) Patent No.: US 7,707,065 B1
(45) Date of Patent: Apr. 27, 2010

(54) METHOD AND ARRANGEMENT FOR DISTRIBUTING INFORMATION AND SERVICES THROUGH A NETWORK

(75) Inventor: Timo Juhani Kangas, Helsinki (FI)

(73) Assignee: Tecnomen Oyj, Espoo (FI)

( * ) Notice: Subject to any disclaimer, the term of this patent is extended or adjusted under 35 U.S.C. 154(b) by 2011 days.

(21) Appl. No.: 10/088,926

(22) PCT Filed: Sep. 27, 2000

(86) PCT No.: PCT/FI00/00822

§ 371 (c)(1),
(2), (4) Date: Mar. 20, 2002

(87) PCT Pub. No.: WO01/24071

PCT Pub. Date: Apr. 5, 2001

(30) Foreign Application Priority Data

Sep. 29, 1999 (FI) .................................. 19992084

(51) Int. Cl.
*G06Q 30/00* (2006.01)
(52) U.S. Cl. .......................................... 705/26; 705/37
(58) Field of Classification Search .................. 705/26, 705/14
See application file for complete search history.

(56) References Cited

U.S. PATENT DOCUMENTS

| | | | | |
|---|---|---|---|---|
| 4,850,007 | A | | 7/1989 | Marino et al. .................. 379/67 |
| 5,333,186 | A | | 7/1994 | Gupta .......................... 379/201 |
| 5,794,210 | A | * | 8/1998 | Goldhaber et al. ............. 705/14 |
| 5,852,775 | A | | 12/1998 | Hidary ........................ 455/404 |
| 5,870,030 | A | | 2/1999 | DeLuca et al. .......... 340/825.44 |
| 5,870,724 | A | | 2/1999 | Lawlor et al. .................. 705/42 |

FOREIGN PATENT DOCUMENTS

| | | |
|---|---|---|
| EP | 0 946 061 | 9/1999 |
| WO | 97/22074 | 6/1997 |
| WO | 98/34189 | 8/1998 |
| WO | 98/34392 | 8/1998 |
| WO | 98/56154 | 12/1998 |

* cited by examiner

*Primary Examiner*—James Zurita
(74) *Attorney, Agent, or Firm*—Darby & Darby P.C.

(57) ABSTRACT

A method is provided for distributing information or services through a network. A piece of information or service to be distributed is composed and a list of intended recipients is compiled (301, 301', 302, 601, 602). Said piece of information or service is released (304, 304', 603) so that it becomes accessible to the recipients appearing on said list. As a response to an indication (305, 401, 606) of a certain recipient having accessed (605) said piece of information or service, an account associated with said certain recipient is credited (306, 608).

2 Claims, 8 Drawing Sheets

Figure 1:
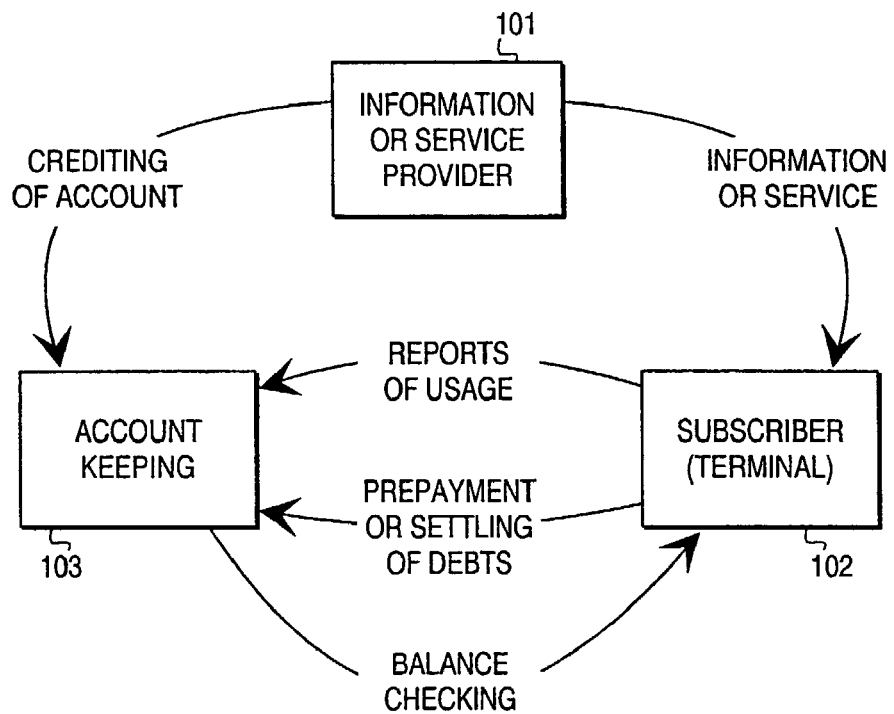

METHOD AND ARRANGEMENT FOR DISTRIBUTING INFORMATION AND SERVICES THROUGH A NETWORK

The invention concerns generally the technology of computer networks and telecommunication networks, and provision of information and services to the users of such networks. Especially the invention concerns the technology of making the reception of information and services through a network attractive to users.

The amount of information communicated between people through various computer and telecommunication networks is increasing rapidly. Simultaneously it has become increasingly popular to use such networks for the distribution of unsolicited information, like advertisements. The most widely used method for direct marketing through a computer network is to find access to a list of e-mail addresses and arrange for a message to be sent into each address in the list. In telecommunication networks capable of transmitting text messages like the known SMS messages (Short Message Service) it is possible to compile a list of telephone numbers and transmit a text message to each number.

Users of computer networks and telecommunication networks have not always agreed upon the positive impact of using the network for large-scale broadcast-type distribution of information. People often regard unsolicited messages as "junk mail" that causes more irritation and annoyance than positive attention.

The conventional way of attacking the problem of unsolicited electronic information is to compile various lists of the accounts of those users that have expressed their wish not to receive such information. A responsible advertiser may then check from a list whether or not he is allowed to send unsolicited information to a certain user. These prior art methods are rather inflexible since they do not separate between those advertisers or agitators who just want to exploit the relative ease and inexpensiveness of distributing large amounts of marketing briefs from those who are ready to invest on a well-designed marketing campaign through a network.

From the patent publications U.S. Pat. No. 5,333,186, U.S. Pat. No. 4,850,007 and WO 98/34392 there is known the concept of sponsored calling through a telephone network. A telephone operator or a corresponding service provider may offer cheaper rates or even toll-free calling for such callers who accept an advertisement to be played on the line at some stage(s) of a telephone call. In a conventional telephone network this means that for a certain period of time immediately before, during and/or immediately after a telephone call, at least one of the parties of the call is coupled to a distant voice reproduction apparatus that plays a previously recorded acoustic message through the telephone network. Also video telephone embodiments have been envisioned where the message could be audiovisual.

It is an object of the present invention to provide a method and an arrangement for offering information and services through a network in such a way that receiving them can be made attractive to a user.

The objects of the invention are achieved by arranging for a compensation to be awarded to a user's account most advantageously in a prepaid service system as a response to an indication that the user has received a piece of information.

The method according to the invention comprises the steps of
  composing a piece of information or service to be distributed
  compiling a list of intended recipients
  releasing said piece of information or service so that it becomes accessible to the recipients appearing on said list.

It is characterized in that it comprises additionally the step of
  as a response to an indication of a certain recipient having accessed said piece of information or service, crediting an account associated with said certain recipient.

The invention applies also to an arrangement which comprises
  a source of information or services
  a number of subscriber terminals
  means for maintaining accounts associated with certain subscribers
It is characterized in that it comprises
  means for providing an indication of a certain recipient having accessed a piece of information or service and
  means for responding to said indication by crediting an account associated with said certain recipient.

Receiving information and services, even unsolicited, becomes usually much more attractive if the recipient associates it with some concrete advantage to himself. Using a network as such usually involves some costs to a user, and often the network functions as the channel for the user to use some additional services, the use of which is also chargeable. The user has a certain account to keep track of such costs and charges. An advantageous form of associating the reception of certain information with an advantage to its recipient is to arrange for compensation to be awarded in the form of crediting the user's account when the user consents to receive the information.

The concept of prepaid services means that an account exists for a user where records are kept representing the user's usage of certain service(s). The user has the right to use said service(s) up to a certain amount. In some embodiments the user has previously placed "electronic money" or other forms of payment into the account, so that each time when he uses a service the price for it is deducted from the balance of the account. In some other embodiments the service provider trusts the user so much that the latter may use a service without paying in advance, and only at regular intervals it is checked from the account how much debt has accumulated. The debt is then settled e.g. by sending an invoice to the user.

The invention is most preferably applied so that the advertiser (or other party that wishes to transmit information or services to users) promises to credit the account of each user by a certain amount if the user accepts to receive the transmission. Various methods can be presented to make sure that the user really receives the information or uses the service. Various methods can also be presented to arrange for the actual crediting of the user accounts, and to compile the list of those potential users that are the targets of the transmissions.

The invention differs from the known sponsored calling through a telephone network, because in a sponsored calling arrangement some information may be provided to users only when at least one user himself decides to make a call. The invention allows for the transmission moment to be chosen freely.

The invention also makes a difference between an "ad hoc" junk mail broadcaster and a serious, investing advertiser or information provider or service provider, since only the latter have the will and means for arranging for compensations to be paid to responding users' accounts.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

Figure 2:
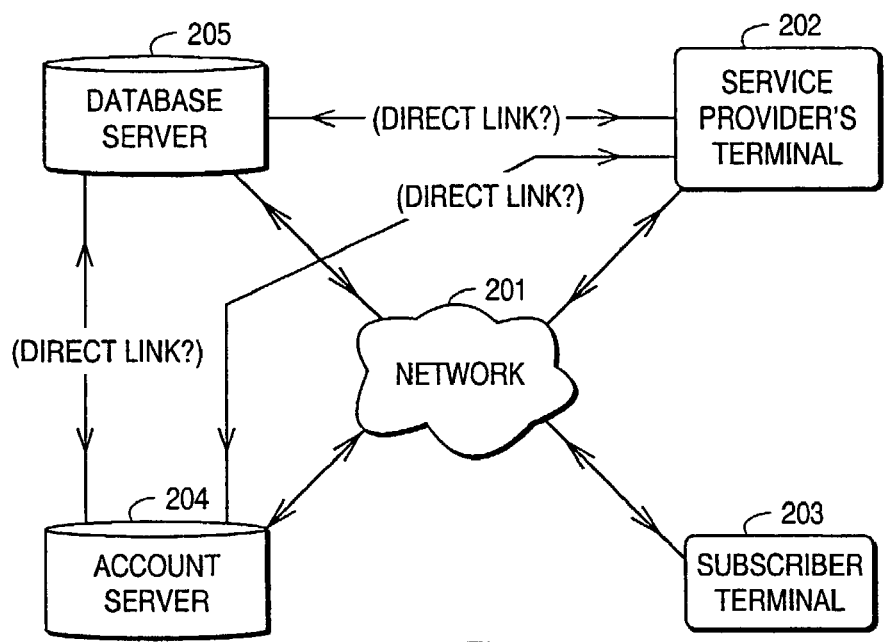
Figure 3A:
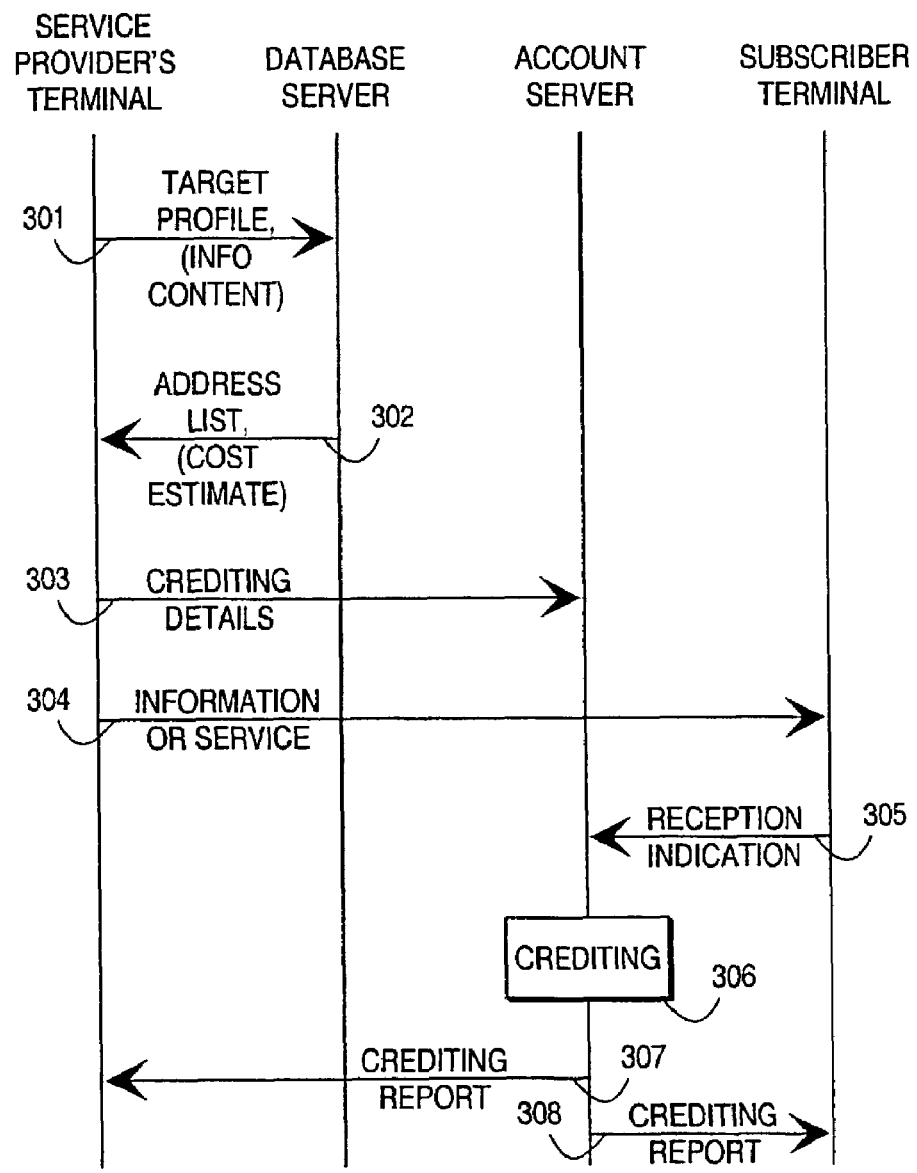
Figure 3B:
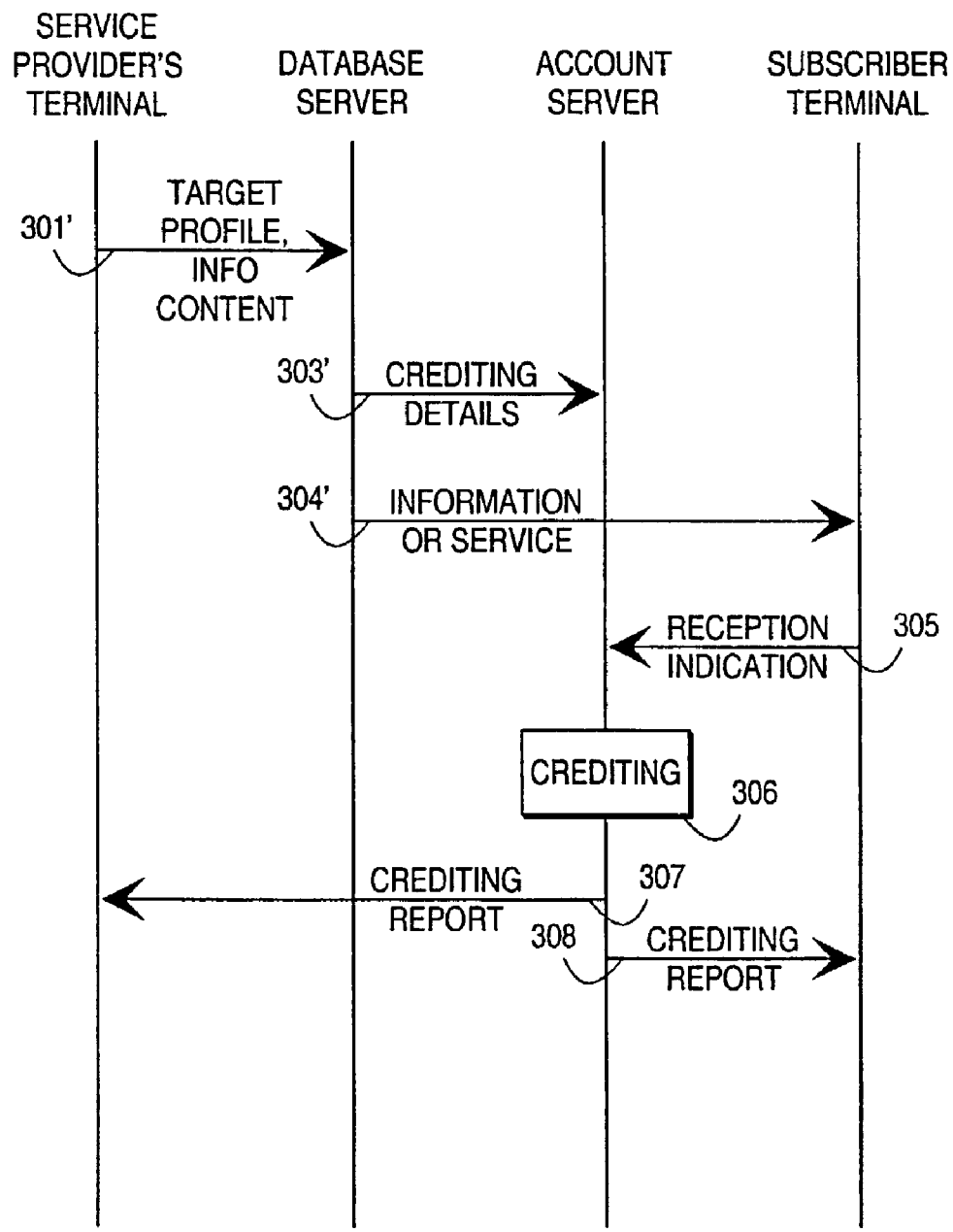
Figure 4:
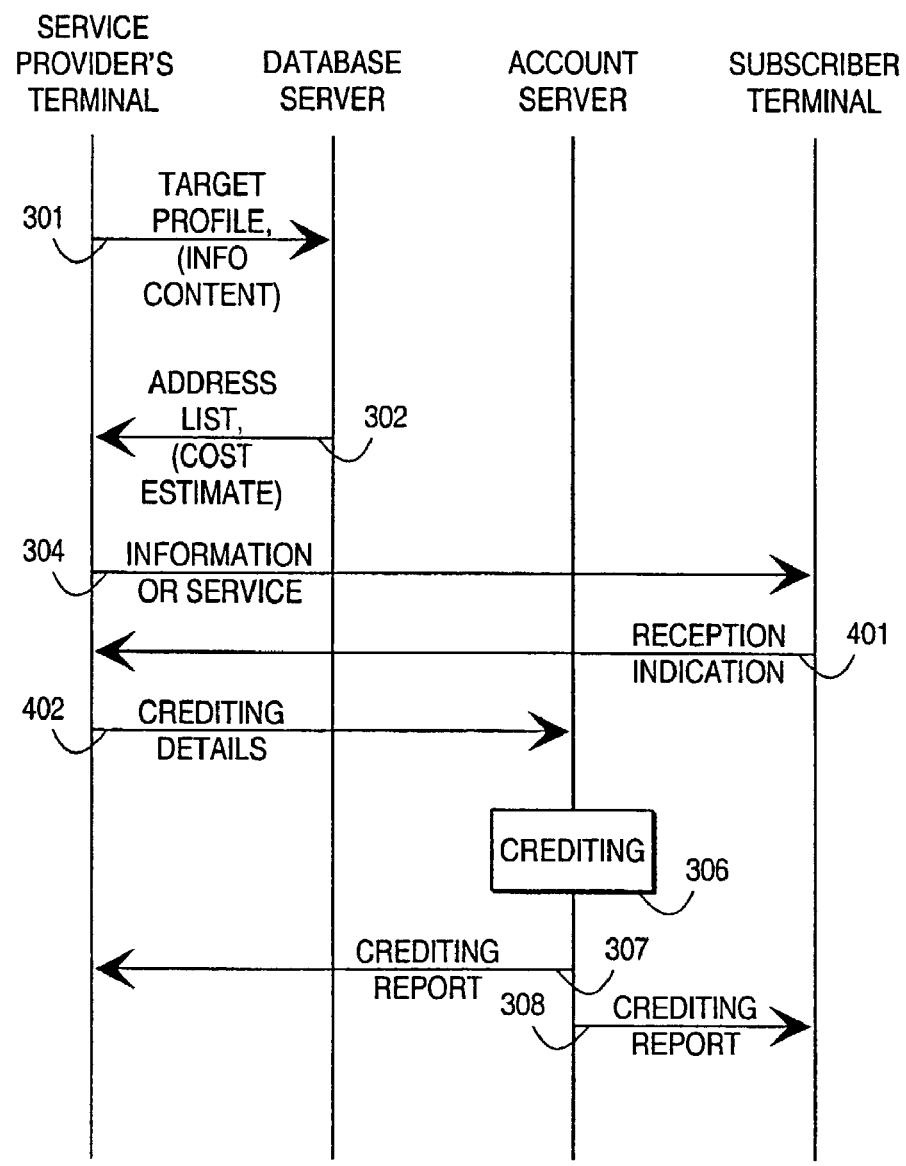
Figure 5:
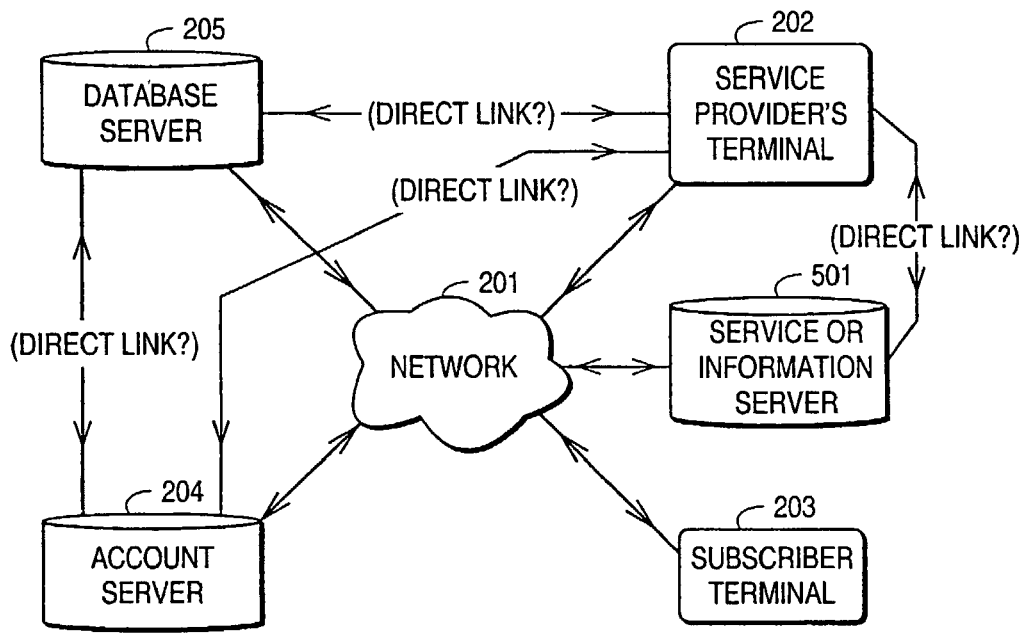
Figure 11:
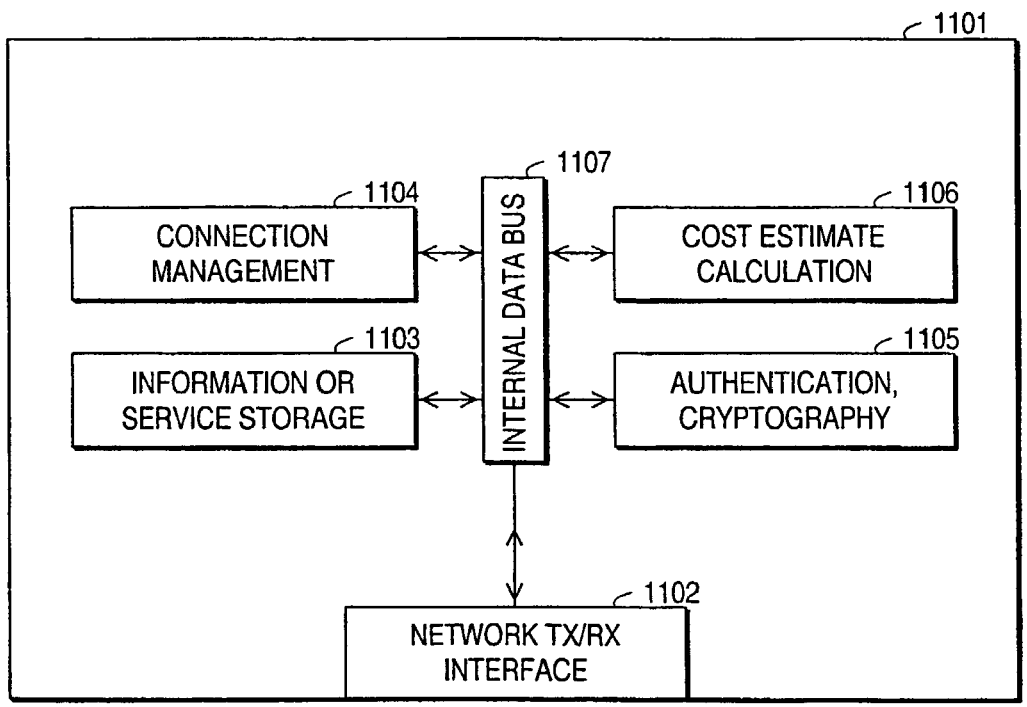
Figure 6:
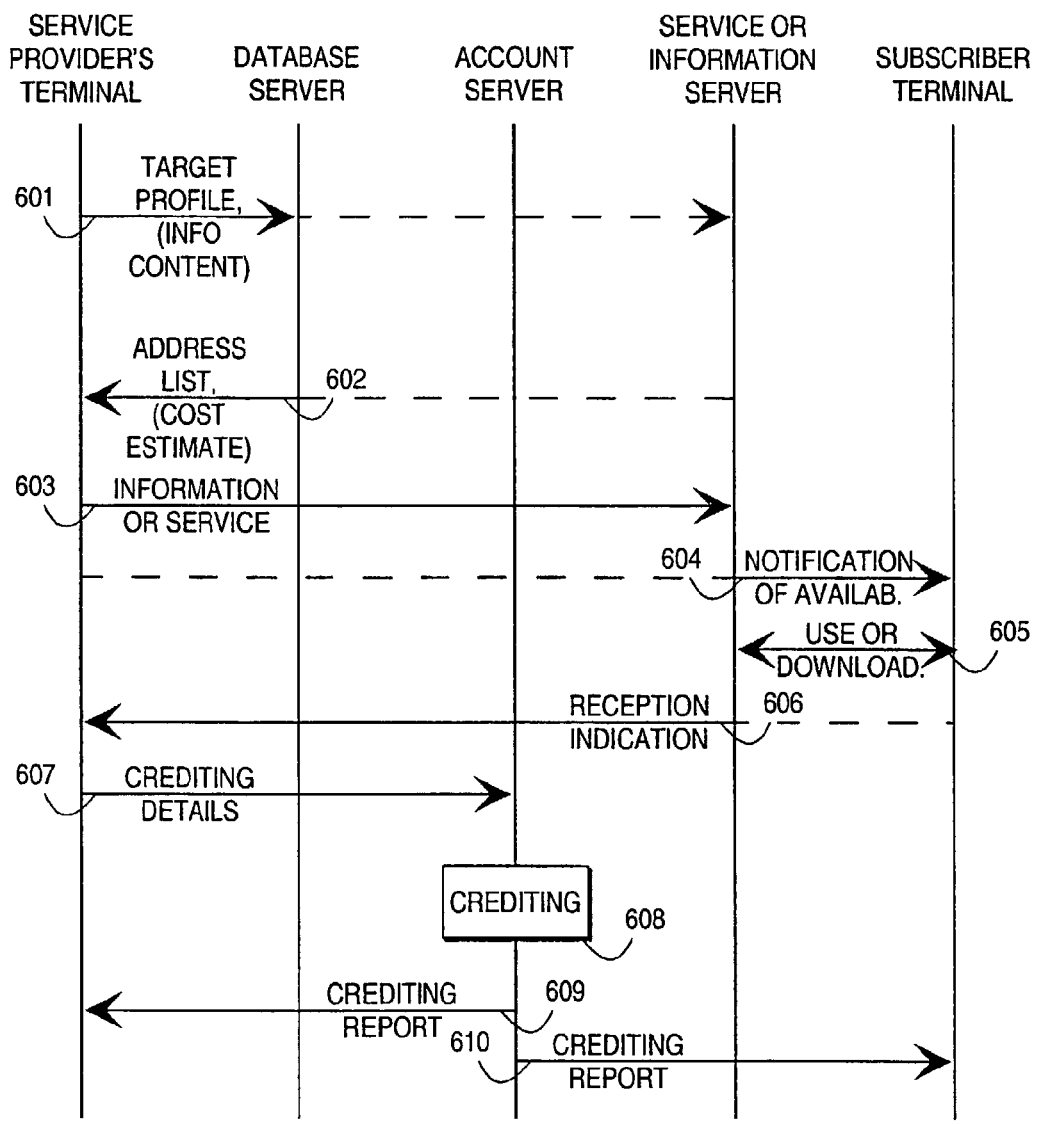
Figure 7:
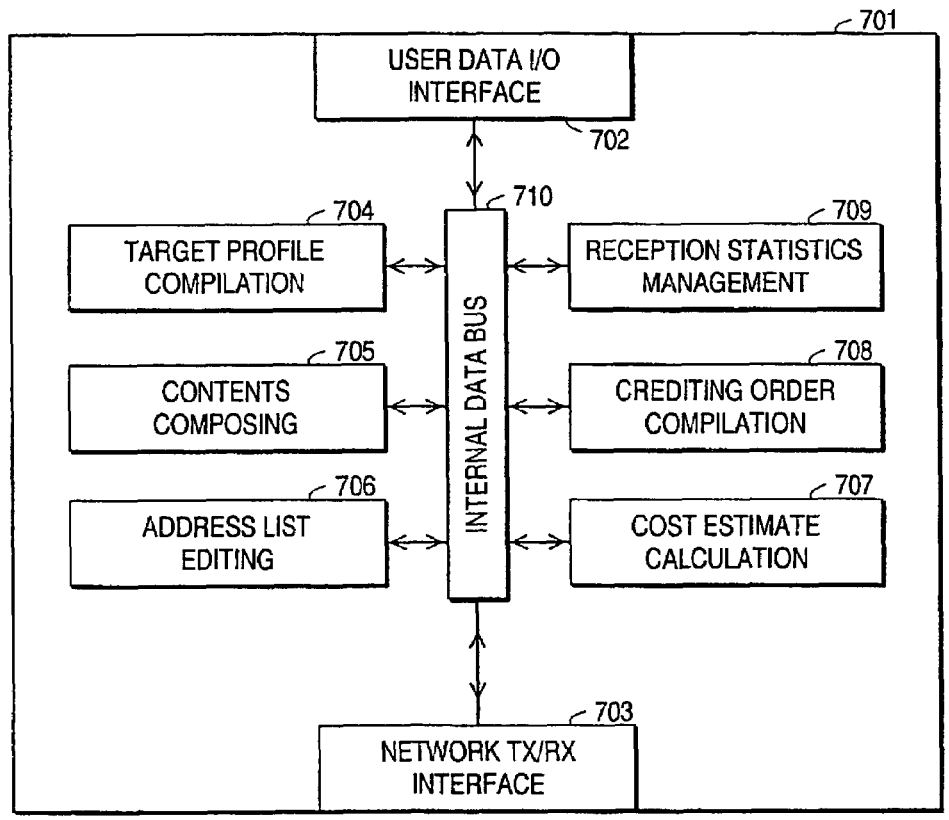
Figure 8:
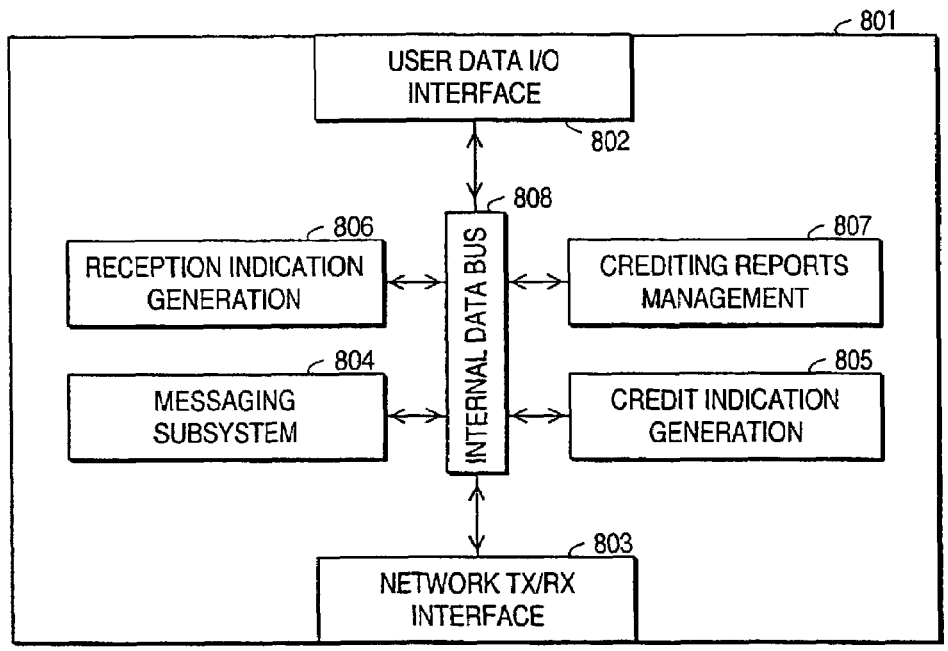
Figure 9:
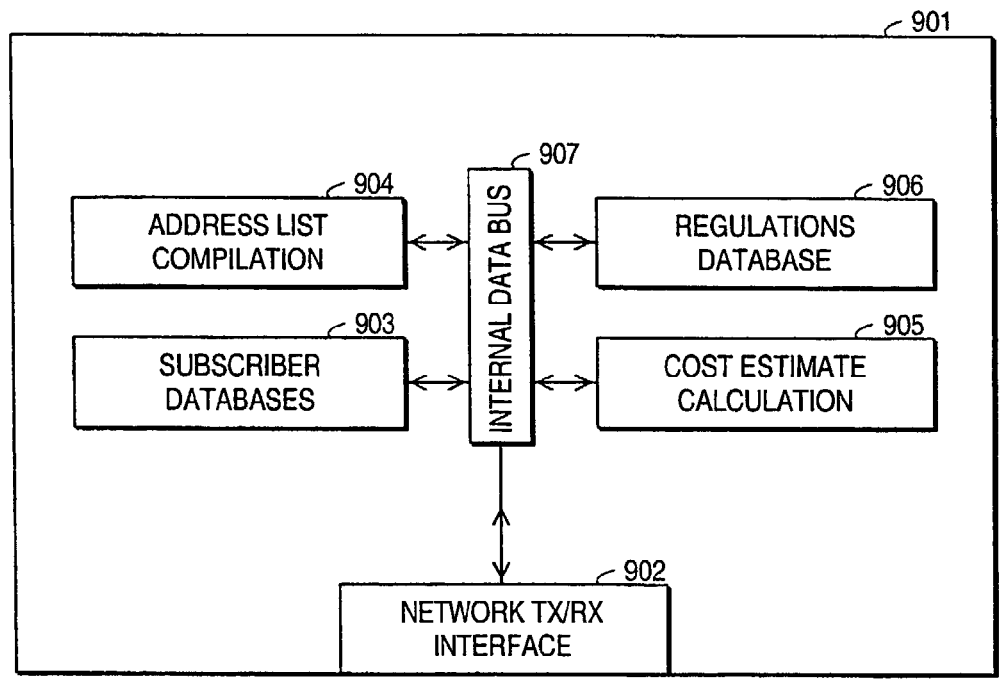
Figure 10:
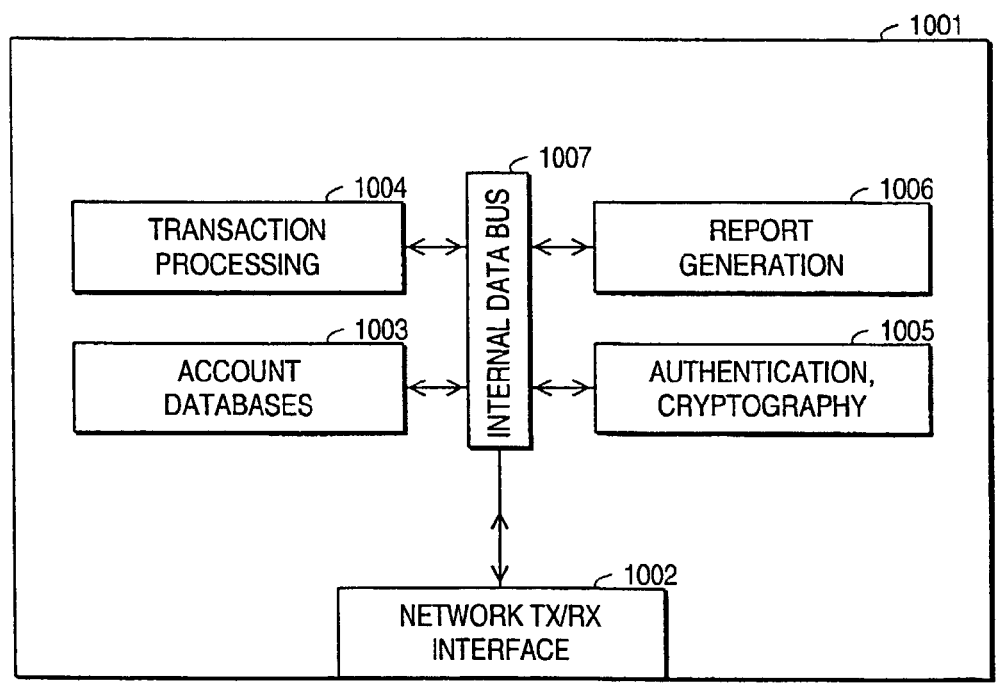

FIG. 1 illustrates an advantageous embodiment of the invention on a conceptual level, FIG. 2 illustrates a first advantageous network architecture in accordance with the invention, FIG. 3a illustrates a method according to a first embodiment of the invention, FIG. 3b illustrates a variant of the method according to FIG. 3a, FIG. 4 illustrates a method according to a second embodiment of the invention, FIG. 5 illustrates a second advantageous network architecture in accordance with the invention, FIG. 6 illustrates a method according to a third embodiment of the invention, FIG. 7 illustrates a service provider's terminal according to an embodiment of the invention, FIG. 8 illustrates a subscriber terminal according to an embodiment of the invention, FIG. 9 illustrates a database server according to an embodiment of the invention, FIG. 10 illustrates an account server according to an embodiment of the invention and FIG. 11 illustrates a service or information server according to an embodiment of the invention.

Similar parts in the drawings are denoted with the same reference designators. FIG. 1 illustrates an information or service provider 101, a subscriber represented by his terminal 102 and an account keeping institution 103. The part of FIG. 1 which corresponds to known technology is the interaction between the subscriber 102 and the account keeper 103: the latter receives reports concerning the user's usage of certain services through a network, so that their price may be debited from the user's account. The account keeper 103 also receives, in some way or another, payments from the subscriber 102. These payments may be made either in advance, in which case we are discussing a prepaid accounting system, or afterwards so that the user settles his accumulated debts by paying his bill(s). The subscriber 102 usually receives reports from the account keeper 103 either regularly or by request so that he may check the balance of his account(s).

According to the present invention the information or service provider 101 communicates both with the subscriber 102 and with the account keeper 103 so that if and when the subscriber 102 accepts to receive a service or a piece of information from the provider 101, his account (or some other separately defined account) at the account keeping institution 103 gets credited by the information or service provider 101. Usually the latter has also an own account at the account keeping institution 103, so a crediting order from the information or service provider 101 causes a transfer between accounts to take place at the account keeping institution 103. If the information or service provider 101 does not have an account of his own which would be accessible to the account keeping institution 103, any known forms of payment may be used to refund to the account keeping institution 103 the credits made to the subscribers' accounts.

FIG. 2 illustrates a network architecture where all communication takes most advantageously place through at least one network 201, such as the Internet, a collection of smaller computer networks or a part of a cellular radio network. Coupled to the network there are a service provider's terminal 202, a subscriber terminal 203, an account server 204 and a database server 205 which we may also designate as the awarding information server or AIS. The invention does not preclude direct links between the service provider's terminal 202, the account server 204 and the database server 205; indeed some of these devices may be physically implemented in the same computer system.

The service provider's terminal 202 may be any terminal with a user interface defining data input and output capabilities. A typical service provider's terminal 202 could be a computer workstation. The subscriber terminal 203 may be e.g. a desktop computer coupled to the Internet, a laptop computer with wired or at least partly wireless connection to the Internet or a similar packet-switched network, a mobile telephone, a pager, a fixed or portable facsimile device, a multimedia terminal coupled to a cable network or in general any subscriber terminal which is capable of at least receiving information from a network. Preferably the subscriber terminal is also capable of transmitting information to other devices coupled to the network 201. The account server 204 and database server 205 may be known large-capacity data storage stations with data input and output capabilities through the network 201.

In accordance with the first embodiment of the invention the database server 205 is used to store and organize contact and profile information of subscribers. The minimum amount of information to be stored about each subscriber is the address or identification code through which the user's terminal may be reached through the network 201, and preferably also an indicator identifying a subscriber account in the account server 204. However, it is advantageous if the database server may also store information regarding the subscriber's age, sex, domicile, profession, nationality, language skills, hobbies, interests and other things that are important when a target group is determined for the distribution of services and/or information. It should be noted that governmental regulations usually determine, what kind of information may be collected and stored regarding people, so these regulations must be obeyed when the database(s) at the database server 205 are compiled and maintained. The invention does not limit the source(s) which are used to collect the information to the database server 205. The information may e.g. originate from intended subscriptions to the "get-credits-by-receiving-message" service by the subscribers.

A method of using the arrangement of FIG. 2 is described next with reference to FIG. 3a. At step 301 the service provider's terminal transmits to the database server a request comprising at least a certain target profile and preferably also some description of the information or service which the service provider intends to send to a group of subscribers. A target profile is a set of criteria which a subscriber should fulfil to qualify as a potential recipient of the intended information or service. For example the service provider could like to reach all male soccer enthusiasts between 15 and 35 years of age and living in greater London. The service provider's terminal may also transmit to the database server the actual information content which is intended to be transmitted to the qualifying recipients, or some details describing said information content, in case the information content somehow affects e.g. the selection of potential recipients or the cost that will be caused by the transmission of the information to the recipients. The request transmitted at step 301 may also comprise an indication about the preferred means for transmitting the information to subscribers (e.g. e-mail, SMS message, telefax) but this is not necessary.

When the database server has received the request, it makes a run through the appropriate stored data and compiles a list of all those subscribers that match the target profile. At step 302 it transmits said list back to the service provider's terminal. An entry in the list should comprise at least the contact information of the corresponding subscriber, i.e. a telephone number, a telefax number, an Internet address of the like, and preferably an indicator identifying a subscriber account in the account server. The entry in the list may contain additional information up to the point where the entry is an exact copy of all information which was found in the database server concerning that particular subscriber. However, laws and regulations that protect the privacy of the subscribers must again be respected. Along with the list the database server may transmit also other information, like e.g. a cost estimate indicating how much it would cost to send a piece of information to the recipients appearing on the list, or restrictions found in the database server and governing the transmission of information and/or services to some or all subscribers on the list.

After the service provider's terminal has received the list of potential recipients from the database server, the service provider can compile the final list of intended recipients to which the information or service will be transmitted. At this stage the service provider finally decides, which form of transmission will be exploited. The list received from the database server may recite several different ways for contacting a certain subscriber, so the service provider may e.g. decide to use e-mail as the form of transmission to those recipients who have an e-mail address, SMS message for those of the rest who have a digital mobile telephone number, and telefax or voice-synthesized telephone call for the others.

At step 303 the service provider's terminal transmits to the account server a preliminary order for crediting the accounts of the subscribers that appear on the final list of intended recipients. The amount by which the accounts should be credited can be freely decided by the service provider. The preliminary nature of the order means that the actual crediting is not yet accomplished, because there is no evidence about the intended recipients actually receiving the information or service to be transmitted. If the database server has not provided the service provider with account indicators, step 303 is omitted.

At step 304 the service provider's terminal transmits the actual information or service to the intended recipients. Only one subscriber terminal is shown in all drawings of this patent application, but it is easy to understand that a practical embodiment of the invention would encompass the transmission of information or service to a large number of subscriber terminals. When the information or service has been received by the subscriber terminal, an indication is given to the user of the terminal. In accordance with the first embodiment of the invention, this indication should tell the user that reading the information or using the service will cause the corresponding subscriber account to be credited. It is then left to the discretion of the user to choose, whether to read the information or use the service, or whether to discard the received transmission without reading or using it.

In FIG. 3a we assume that the user decides to read the information or to use the service. Reading the information or using the service causes a reception indication to be transmitted to the account server at step 305. The contents of the reception indication should include at least the identifier of the subscriber terminal from which it is coming, so that the account server is able to determine, which account should be credited. If the database server has not previously provided the service provider with account indicators, the reception indication transmitted at step 305 is the only way of providing the account server with the complete account indicator or corresponding information on the basis of which the account can be unambiguously identified. The reception indication may naturally identify also some other account, to enable e.g. charity donations (like "instead of crediting my account, please credit the account XXXX-YYYY belonging to the International Red Cross").

In FIG. 3a step 306 represents the actual crediting in which the previously defined transfer is made from the account of the service provider to the account of the subscriber or to the account indicated by the subscriber. The method according to the first embodiment of the invention might terminate here. However, in order to assure both the service provider and the subscriber that the crediting has been accomplished, it may be advantageous to make the account server transmit a crediting report to both of them. The transmission of crediting reports is shown in FIG. 3a as steps 307 and 308.

FIG. 3b illustrates a variation of the above-explained method. At step 301' the service provider's terminal transmits to the database server a message that definitely comprises both the target profile and the information content which the service provider wishes to be transmitted. The database server compiles the list of potential recipients as explained before, but instead of sending it back to the service provider for revision it just informs the account server at step 303' about the subscribers appearing on the compiled list, and starts transmitting the information to the subscribers at step 304'. Steps 305, 306, 307 and 308 take place exactly as explained above.

FIG. 4 illustrates a method according to a second embodiment of the invention. The steps of ordering the list of potential recipients from the database server (step 301) and providing it (step 302) take place as explained previously in association with FIG. 3a. However, in this second embodiment of the invention the service provider does not inform the account server beforehand but starts transmitting 304 the information or service to the subscriber terminals immediately after the final list of intended recipients has been completed between steps 302 and 304. If the user decides to read the information or to use the service, the subscriber terminal transmits at step 401 its reception indication to the service provider's terminal and not to the account server. Only after the reception indication has been received, the service provider's terminal transmits the corresponding crediting order to the account server at step 402. After that the steps of performing the crediting at step 306 and potentially reporting at steps 307 and 308 are similar to the corresponding steps in FIGS. 3a and 3b.

Those embodiments where the service provider transmits a preliminary crediting order to the account server before transmitting the information or service to the subscriber terminals are more advantageous than the embodiment of FIG. 4 in the sense that they reduce the service provider's chance for cheating: nothing actually guarantees that the service provider will actually transmit the crediting order in the embodiment of FIG. 4. On the other hand the embodiment of FIG. 4 has the advantage that many e-mail systems and other existing transmission arrangements already comprise the means for informing the transmitting party whether or not the receiving party has actually received and opened the message. The transmission of the reception indication 401 could then be based on such existing automatic acknowledgement. A further embodiment of the invention which would combine these two advantages would be a one resembling the embodiment of FIG. 3a with the exception that the "crediting details" message transmitted to the account server at step 303 would also comprise the actual information or service to be transmitted to the subscriber terminals, so that the account server would take care of the actual large-scale transmission (the arrow of step would run between the account server and the subscriber terminal).

It is also regarded as advantageous to the various embodiments of the method according to the invention if the anonymity of the subscribers can be protected to as large an extent as possible. In other words, it is usually advantageous if the information or service provider does not receive any such information that would be useful to single out a particular subscriber. Additionally it is advantageous from the database keeper's point of view if the information or service provider will not be able to reuse a once-obtained list of intended recipients at some later time instant and/or to some other purposes. Anonymity and knowledge about the contact information not being susceptible to being uncontrollably distributed are usually in the interests of the subscribers.

One way of achieving both anonymity and "throwaway" recipient lists is to use an embodiment of the invention like in FIG. 3b where the service provider's terminal transmits to the database server a message that definitely comprises both the target profile and the information content which the service provider wishes to be transmitted. The database server then compiles the list of potential recipients and starts transmitting the information to the subscribers; the information or service provider will not see the compiled list of potential recipients at all. Another way of providing anonymity is to transmit the list of potential recipients to the service provider's terminal in some encrypted form, and to provide a specific application program to the service provider's terminal which is only capable of showing the intended recipients to the information or service provider as "NN-1", "NN-2" and so on. The same specific application program might then be used to implement the "throwaway" feature of the list: the program might only allow the information or service provider to access an obtained list once.

One could also present a simple embodiment where the account server would not be informed beforehand at all, and the subscriber terminals could just respond to the reception of information or service from the service provider's terminal by ordering a crediting step to be performed at the account server. However, such a simple embodiment runs the risk of a dishonest subscriber copying and redistributing the received information or service to all his friends so that everybody could order a credit despite of that only one of them was actually on the list of intended recipients. Cryptographic methods can be applied to prevent false crediting orders. The simplest way of discouraging cheating attempts is to store at the account server beforehand the list of accounts that are qualified for crediting as shown above at steps 303 and 303', and to cross-correlate that list with the crediting orders so that only qualified accounts can be credited, and every qualified account can be credited only once.

We might analyze in more detail the moment when the information or service originating from the service provider has reached the subscriber terminal but the user has not yet decided, whether or not he will actually receive (read or use) it and get the promised credit. How does the user know that receiving this transmission will cause his account to be credited, and should the amount by which the account will be credited be told to the user before he makes the decision? One possible alternative is to use the "subject" field which is a known feature of e.g. e-mail systems. The service provider might insert into this field e.g. a subject entry like "get XXX worth of credit by opening this message", where XXX means some value which the user is able to comprehend, like "one dollar", "five transmitted SMS messages" or the like. The problem of such approach is that the contents of the subject field are not limited by any way, so the same subject entry could also be used as a joke or as an intentional attempt to mislead the receiving subscriber. Another possible alternative is to establish a number of officially acknowledged communication routers that would act as intermediaries in the transmission of the information or service to the subscriber terminals, so that the name of the officially acknowledged communication router would appear as the name of the sender in the message received at the subscriber terminal. Everybody could then be sure that a message the sender of which appears to be "the_one_dollar_router" or the like is associated with a certain credit for its opener.

Above we have discussed one possible alternative of providing the reception indication from the subscriber terminal to either the account server or the service provider's terminal, namely the automatic acknowledgement known especially from the e-mail systems that are in use at the priority date of this patent application. Another possibility is to include in the transmitted information or service explicit instructions for replying. A message that forms a part of the transmitted information or service can for example comprise a "reply coupon" or a part which the receiving user is instructed to copy and paste into a reply message that he should transmit to a given address. The transmission of such a "reply coupon" can be automatized if the transmitted information or service can comprise a hypertext link or software-implemented reply button the selection of which will cause the subscriber terminal to automatically perform the operations needed for transmitting a "reply coupon" without any further assistance from the user.

In simpler embodiments, especially in association with one-way information transfer like paging and telefaxes but also with two-way applications, the sole indication about the message having been successfully sent towards the subscriber could serve as the indication that triggers the crediting of the subscriber's account.

The invention does not set any limitations to the practical implementations of those steps where the user is informed that receiving a certain transmission will cause his account to be credited or where the subscriber terminal transmits a reception indication.

The embodiments illustrated in FIGS. 2, 3a, 3b, and 4 share the weakness that the whole information or service is transmitted all the way to the subscriber terminal even in those cases where the subscriber decides not to receive it. If the subscriber terminal is a terminal of a cellular radio system, where unnecessary transmissions should always be avoided because transmission resources at the radio interface are scarce, or if the information or service requires the transmission of a large number of bits, this can be a serious drawback.

FIG. 5 illustrates a network architecture where the above-mentioned drawback can be avoided. In addition to the elements introduced already in association with FIG. 2 there is a service or information server 501 which is at least coupled to the network 201 and possibly has also a direct link to at least the service provider's terminal 202. It may naturally have direct links also to any of the devices 204 and 205, and it can even be implemented in the same physical computer as one of the devices 202, 204 or 205. The service or information server 501 can be a general large-capacity data storage station like the devices 204 or 205, or it can be a dedicated messaging center in the sense of the SMS messaging centers and voice mail services known from the technology of telephone networks, or a Multimedia Messaging Center known from the technology of the proposed GPRS (General Packet Radio Service) and third-generation digital cellular network systems.

A method of using the arrangement of FIG. 5 is described next with reference to FIG. 6. At step 601 the service provider's terminal transmits to the database server a request which is similar to the request transmitted at step 301 of FIG. 3a. Optionally the same message or a part of it may also be transmitted to the service or information server, if for example the latter has a role in determining, what will be the estimated cost for using this particular service or information server in the distribution of information or service. The reply from the database server to the service provider's terminal at step 602 is similar to that transmitted at step 302 of FIG. 3a; if the previous transmission or a part of it reached the service or information server, a reply may also come therefrom. After the service provider has finished the editing of the list of intended recipients, he transmits at step 603 the actual information or service to the service or information server. This step may take place also much earlier: if for example the service provider has performed a similar campaign previously, he may reuse the service or information already stored at the service or information server without the need for retransmitting it at step 603. If the following step is to be performed by the service or information server, the transmission at step 603 must also comprise the list of intended recipients.

At step 604 either the service or information server of the service provider's terminal transmits to the subscriber terminals appearing on the final list of intended recipients a notice that a certain information or service would be available for them at the service or information server. This notice contains also an indication to the receiving subscriber that contacting the service or information server for downloading the information or using the service will cause the subscriber's account (or some other account, like a charity account) to be credited by a certain amount. In FIG. 6 we assume that the subscriber decides to collect the credit, so he contacts the service or information server at step 605 for downloading the information or using the service.

A reception indication may be transmitted either from the service or information server or from the subscriber terminal or from both at step 606. The target of the reception indication is the service provider's terminal in FIG. 6, but we may also provide an embodiment where the target of the reception indication is the account server. In the embodiment of FIG. 6 the service provider's terminal collects all reception indications and transmits the corresponding crediting details to the account server at step 607. The actual crediting of accounts (and debiting the service provider's account, is applicable) takes place at step 608, and for completeness we have shown also the steps of transmitting crediting reports to the service provider's terminal and the subscriber terminal at steps 609 and 610.

While the distributed information or service sits in the service or information server, it should somehow be assured that only those subscribers that were on the list of intended subscribers are allowed to access it. If the service or information server is a voice mail system where the distributed piece of information is stored as a (voice simulated) voice message in the voice mailbox of each intended recipient, such assuring is easy: it is a fundamental feature of all voice mail systems that only the proper subscriber terminal has access to the messages stored in its proprietary voice mailbox. However, if the service or information server is a host coupled to the Internet and the distributed service or information is stored as a web page, it may be necessary to include a code word or corresponding secret key into the notice of availability transmitted to the subscriber terminal at step 604. Only by presenting the code word or secret key the subscriber could then access the appropriate web page. A simpler way is to store the list of intended recipients at the service or information server and to compare the identifier of a contact-making subscriber against the list, but since it is rather easy to impersonate another user in a computer network, this approach is not very secure.

It is usually advantageous to apply a certain time limit before which the subscriber must access the distributed service or information in order to collect the credit. In the embodiment of FIG. 6 the time limit can be applied by simply erasing the stored information from the service or information server after the time limit has lapsed. In this and all other embodiments it is also easy to order the account server to ignore all crediting orders related to a certain campaign after the time limit for collecting credits has lapsed. A more elaborated scheme could encompass credits of different value to be given to subscribers according to how fast they react to the offer: for example those subscribers from which a reception indication arrives before a certain first time limit might get the largest credit, those from which a reception indication arrives after said first time limit but before a certain second time limit might get a slightly lower credit and so on until after a final time limit no credits could be collected at all. In another "decreasing credit" scheme the first subscriber (or first N subscribers) to provide a reception indication would get the largest credit, the second (or next M subscribers) would get a slightly smaller credit and so on until after K reception indications have been received no more credits would be given. Here N, M and K are positive integers and $N+M \leq K$.

Next we will briefly describe the devices which form a part of an arrangement according to a preferable embodiment of the invention. FIG. 7 illustrates schematically a service provider's terminal 701 which has a user interface 702 (typically a keyboard and a display) and a network interface 703 through which it is coupled to a network. For compiling target profiles there is a target profile compilation block 704 and for compiling information or service contents there is a contents composing block. Further there is an address list editing block 706 which is used to edit the list of intended recipients. All three blocks 704, 705 and 706 may actually be implemented in a single word processor or desktop publishing program or the like. For handling the cost estimates there is an optional cost estimate calculation block 707, which may be e.g. a spreadsheet program, and a crediting order compilation block 708 which may be e.g. of the type known from terminal banking applications. If the service provider's terminal 701 is to handle the reception indications from the subscribers, it is advantageous to include a reception statistics management block 709 into it; said block may be for example a program that checks the authenticity of reception indications and automatically converts approved reception indications into crediting orders with the help of block 708. An internal data bus 710 links the blocks together.

FIG. 8 illustrates schematically a subscriber terminal 801 which has a user interface 802. It may be a complete keyboard and display interface or it may be only a small alphanumeric screen and a limited selection of push buttons. The invention does not rule out even more exotic user interfaces like acoustic ones based on voice recognition and speech synthesis. The subscriber terminal has also a network interface 803 which may be a wired connection to the Internet, a wireless connection to a cellular radio network or some other kind of connection. To handle the reception and transmission of messages there is a messaging subsystem block which may be e.g. an e-mail program or an SMS application. A block 805 is provided for indicating to the user that a certain received message or service is associated with the possibility of getting credit; the block may well be a part of the messaging subsystem 804 is the indication is provided e.g. only in the subject or sender field of e-mail messages. For generating the reception indications there is a block 806 which may also be a part of e.g. an e-mail system, if the known reception acknowledgement features referred to previously are used. In case the same terminal is used for managing network accounts, there is also shown a crediting reports management block 807. An internal data bus 808 again links the blocks together.

An exemplary database server 901 is shown schematically in FIG. 9. Apart from the obviously necessary network interface 902 the most important part of the database server is the subscriber databases block 903. An address list compilation block 904 is arranged to respond to received target profiles by compiling a list of the matching subscriber information read from the databases. An optional cost estimate calculation block 905 is shown, in case also cost estimates are required from the database server 901. Another optional part is a regulations database 906 through which the database server may check that applicable regulations are obeyed in maintaining the subscriber databases and compiling address lists. An internal data bus 907 again links the blocks together.

An exemplary account server 1001 is shown schematically in FIG. 10. Again there is a network interface 1002 to couple the device to a network. Additionally there is an account databases block 1003 for keeping the actual accounts, and a transaction processing block 1004 for receiving crediting and debiting requests from the network and converting them into valid transactions on the accounts. An authentication and cryptography block 1005 is provided for ensuring that the crediting and debiting requests come from authenticated sources and for enhancing the overall level of security relating to account transactions. A separate report generation block 1006 is used to generate and transmit the crediting reports. An internal data bus 1007 again links the blocks together.

For those embodiments of the invention where a separate service or information server is used, an example of such a device 1101 is shown in FIG. 11. There is a network interface 1102 and an information or service storage 1103, which may be a collection of stored web pages, a collection of voice mailboxes or some other large-capacity data storage. A connection management block 1104 manages the connections to and from the information or service storage 1103 so that only authenticated users get access to the information or service which they are entitled to. These functions are supported by an authentication and cryptography block 1105, and in case the service or information server has a role in cost estimation there may be a cost estimate calculation block 1106. An internal data bus 1107 again links the blocks together.

In the foregoing we have referred exclusively to commercial applications of the invention. However, with some modifications the invention has applicability also in for example electronic elections. The service provider might be a general election board, the database server could be a population register server and the account server could be a register where it is documented, whether or not a certain citizen has used his right to vote or not. A separate ballot server could be used as the service or information server appearing in the embodiment of FIG. 6. The general election board may use the population register server to compile a list of the electronic addresses of all citizens entitled to vote. Storing an electronic voting slip at the ballot server would correspond to step 603 in FIG. 6, and a notification of the elections would be transmitted to each citizen appearing on the list of electronic addresses. When a voter contacts the ballot server, he uses a cryptographic authentication method to identify himself. When the voter has filled in the electronic voting slip, the ballot server disables any further contacts by the same voter and sends a "reception indication" to the account server, which "credits" the voter's account by recording that the voter has voted. This modification of the invention differs from the others in that no actual crediting takes place onto any such account that would represent the subscriber's rights to use some services through the network.

Also other modifications to the above-presented embodiments are possible; such modified embodiment are nevertheless intended to fall within the scope of the appended claims.

The invention claimed is:

1. A method for distributing information or services through a computer or cellular network, comprising the steps of:
　composing a piece of information or service to be distributed through the computer or cellular network;
　compiling a list of intended recipients;
　releasing said piece of information or service so that said piece of information or service becomes accessible to the recipients appearing on said list; and
　as a response to an indication of a certain recipient having accessed said piece of information or service, crediting an account associated with said certain recipient,
　wherein the step of crediting an account comprises the substeps of:
　　defining the time taken for said indication to be received; and
　　crediting said account by an amount which is inversely proportional to said time.

2. A method for distributing information or services through a computer or cellular network, comprising the steps of:
　composing a piece of information or service to be distributed through the computer or cellular network;
　compiling a list of intended recipients;
　releasing said piece of information or service so that said piece of information or service becomes accessible to the recipients appearing on said list; and
　as a response to an indication of a certain recipient having accessed said piece of information or service, crediting an account associated with said certain recipient, wherein the step of crediting an account comprises the substeps of:
　ranking the order in which said certain recipient provides the reception indication relative to other of said intended recipients; and
　crediting said account associated with said certain recipient based on the order ranking.

* * * * *